United States Patent
Li et al.

(10) Patent No.: US 11,754,777 B2
(45) Date of Patent: Sep. 12, 2023

(54) LOW-CROSSTALK LARGE-CAPACITY FEW-MODE OPTICAL FIBER

(71) Applicant: Yanshan University, Qinhuangdao (CN)

(72) Inventors: Shuguang Li, Qinhuangdao (CN); Pengshuai Shao, Qinhuangdao (CN); Jianshe Li, Qinhuangdao (CN); Ying Guo, Qinhuangdao (CN); Xiaojian Meng, Qinhuangdao (CN)

(73) Assignee: Yanshan University, Qinhuangdao (CN)

( * ) Notice: Subject to any disclaimer, the term of this patent is extended or adjusted under 35 U.S.C. 154(b) by 0 days.

(21) Appl. No.: 17/864,425

(22) Filed: Jul. 14, 2022

(65) Prior Publication Data

US 2023/0064605 A1     Mar. 2, 2023

(30) Foreign Application Priority Data

Aug. 24, 2021   (CN) .......................... 202110975835.9

(51) Int. Cl.
  *G02B 6/02*   (2006.01)
  *G02B 6/036*   (2006.01)

(52) U.S. Cl.
  CPC ...... *G02B 6/02042* (2013.01); *G02B 6/03611* (2013.01)

(58) Field of Classification Search
  CPC .................. G02B 6/02042; G02B 6/03611
  See application file for complete search history.

(56) References Cited

U.S. PATENT DOCUMENTS

| | | | |
|---|---|---|---|
| 9,250,383 B2* | 2/2016 | Gruner-Nielsen | ........................... G02B 6/03627 |
| 9,817,183 B2* | 11/2017 | Amma | ............... G02B 6/02042 |
| 2014/0064686 A1 | 3/2014 | Lars et al. | |
| 2014/0178024 A1* | 6/2014 | Takenaga | ........... G02B 6/02042 385/126 |
| 2016/0274300 A1 | 9/2016 | Li et al. | |

FOREIGN PATENT DOCUMENTS

| | | |
|---|---|---|
| CN | 105866881 A | 8/2016 |
| CN | 108680990 A | 10/2018 |
| CN | 112346170 A | 2/2021 |

* cited by examiner

*Primary Examiner* — Ryan A Lepisto
(74) *Attorney, Agent, or Firm* — BAYRAMOGLU LAW OFFICES, LLC

(57) ABSTRACT

A low-crosstalk large-capacity few-mode optical fiber includes an optical fiber cladding. Few-mode units are arranged in the optical fiber cladding, each few-mode unit sequentially includes a few-mode fiber core, an inner cladding and a trench from inside to outside, and a high-refractive-index ring is arranged in the few-mode fiber core. The few-mode units include first few-mode subunits, second few-mode subunits and third few-mode subunits, where the first few-mode subunits, the second few-mode subunits and the third few-mode subunits are arranged at intervals. The first few-mode subunit includes a first few-mode fiber core, the second few-mode subunit includes a second few-mode fiber core, and the third few-mode subunit includes a third few-mode fiber core, the radii and refractive indexes of the first few-mode fiber cores, the second few-mode fiber cores and the third few-mode fiber cores being different, respectively.

7 Claims, 5 Drawing Sheets

LOW-CROSSTALK LARGE-CAPACITY FEW-MODE OPTICAL FIBER

CROSS REFERENCE TO THE RELATED APPLICATIONS

This application is based upon and claims priority to Chinese Patent Application No. 202110975835.9, filed on Aug. 24, 2021, the entire contents of which are incorporated herein by reference.

TECHNICAL FIELD

The present application belongs to the technical field of optical fiber communication, and particularly relates to a low-crosstalk large-capacity few-mode optical fiber.

BACKGROUND

The first optical fiber in the world is manufactured by Corning Glass Works in Corning Incorporated by adopting a vapor deposition method, followed by rapid development in the preparation technology and the application field of optical fibers. As the technologies such as time division multiplexing, wavelength division multiplexing and partial division multiplexing have been applied, the transmission capacity of traditional optical fibers has increased rapidly, thereby approaching the Shannon limit. However, the transmission capacity of traditional optical fibers cannot meet the requirement of Age of Big Data, so that a method for solving the transmission capacity challenge has been found in the existing spatial dimension, that is the space division multiplexing technology, an important way for assuring the development of the future communication field. The space division multiplexing technology comprises two parts of multi-core multiplexing and mode multiplexing. Firstly, a plurality of independent fiber cores are arranged on an optical fiber cladding, so that transmission channels are increased, and secondly, a plurality of LP modes are transmitted simultaneously in the core, so that the transmission capacity of the optical fiber is improved. The multi-core few-mode optical fiber based on space division multiplexing utilizes a plurality of fiber cores to transmit a plurality of LP modes simultaneously, so that the transmission capacity of the optical fiber is improved in multiples.

At present, there have been rapid advances in the research of the multi-core few-mode optical fiber. Since the 1980s, the number of cores has increased from 7-9 to 20-30 in the manufacture of multi-core optical fibers in Japan and America, greatly improving the transmission capacity of optical fibers. A great deal of few-mode optical fiber research is published in optical fiber communication conferences such as OFC and ECOC every year, and YOFC has been studying few-mode optical fibers in such aspects as transmission, manufacture and devices since 2014. Aiming at the problems of high crosstalk of a plurality of fiber cores in a cladding, mode coupling caused by too many modes in the fiber cores and the like, methods such as a trench auxiliary structure, an air hole auxiliary structure, a heterogeneous fiber core structure, and a high-refractive-index ring can be adopted to reduce the mode crosstalk between adjacent fiber cores and improve the effective refractive index difference between the modes in the core. The air hole auxiliary structure and the trench auxiliary structure are both used for inhibiting the leakage of the optical energy of the fiber core by reducing the refractive index of the periphery of the fiber core, so that the energy coupling of the fiber core and the cladding is reduced. With homogeneous fiber core arrangement, identical propagation constants of the adjacent fiber cores and matched mode phases will occur, that is, the difference between the optical characteristics of the adjacent fiber cores is small, so that the transverse energy coupling of the adjacent fiber cores in a bending state cannot be reduced, leading to an increase in the inter-core crosstalk. However, the arrangement of heterogeneous cores may cause different propagation constants and a phase mismatch of adjacent fiber cores, so that the transverse energy coupling of the adjacent fiber cores in a bending state is reduced, and the bending resistance of the few-mode optical fiber is improved. The problems of large crosstalk and small capacity in the multi-core few-mode optical fiber transmission process may affect the long-distance transmission performance of a communication system, so that more research and analysis need to be carried out on these problems.

SUMMARY

1. Technical Problem to be Solved

Based on the rapid development of the existing optical fiber communication field, the transmission capacity of traditional optical fibers cannot meet the needs of the present, and therefore, the present application provides a low-crosstalk large-capacity few-mode optical fiber.

2. Technical Solution

In order to achieve the above-mentioned objective, the present application provides a low-crosstalk large-capacity few-mode optical fiber, which comprises an optical fiber cladding, wherein few-mode units are arranged, each few-mode unit sequentially comprises a few-mode fiber core, an inner cladding and a trench from inside to outside, and a high-refractive-index ring is arranged in the few-mode fiber core; the few-mode units comprise first few-mode subunits, second few-mode subunits and third few-mode subunits, wherein the first few-mode subunits, the second few-mode subunits and the third few-mode subunits are arranged at intervals; the first few-mode subunit comprises a first few-mode fiber core, the second few-mode subunit comprises a second few-mode fiber core, and the third few-mode subunit comprises a third few-mode fiber core, the radii and refractive indexes of the first few-mode fiber cores, the second few-mode fiber cores and the third few-mode fiber cores being different.

Another embodiment provided herein is as follows: the optical fiber cladding is made of a silica material, the inner cladding is made of a silica material, the trench is made of a silica material doped with fluorine, the few-mode fiber core is made of a silica material doped with germanium dioxide, and the high-refractive-index ring is made of a silica material doped with high-concentration germanium dioxide.

Another embodiment provided herein is as follows: the first few-mode fiber core, the second few-mode fiber core and the third few-mode fiber core all can transmit an $LP_{01}$ mode, an $LP_{11}$ mode, an $LP_{21}$ mode and an $LP_{02}$ mode.

Another embodiment provided herein is as follows: the few-mode units have a step-type distribution design in refractive indexes.

Another embodiment provided herein is as follows: the optical fiber cladding has a refractive index of $n_0$, the inner cladding has a refractive index of $n_0$, the trench has a refractive index of $n_3$, the first few-mode fiber core has a refractive index of $n_1$, the second few-mode fiber core has a refractive index of $n_4$, and the third few-mode fiber core has a refractive index of $n_6$; the first few-mode subunit comprises a first high-refractive-index ring, the second few-mode subunit comprises a second high-refractive-index ring, and the third few-mode subunit comprises a third high-refractive-index ring, wherein the first high-refractive-index ring has a refractive index of $n_2$, the second high-refractive-index ring has a refractive index of $n_5$, and the third high-refractive-index ring has a refractive index of $n_7$; the $n_1$ is greater than the $n_0$, the $n_2$ is greater than the $n_1$, the $n_3$ is less than the $n_0$, the $n_4$ is greater than the $n_0$, the $n_5$ is greater than the $n_4$, the $n_6$ is greater than the $n_0$, and the $n_7$ is greater than the $n_6$.

Another embodiment provided herein is as follows: $(n_1-n_0)/n_1$ is kept within 0.92%, $(n_2-n_1)/n_2$ is kept within 0.25%, and $(n_0-n_3)/n_0$ is controlled within 0.7%; $(n_4-n_0)/n_4$ is kept within 0.96%, $(n_5-n_4)/n_5$ is kept within 0.25%, and $(n_0-n_3)/n_0$ is controlled within 0.7%; $(n_6-n_0)/n_6$ is kept within 0.88%, $(n_7-n_6)/n_7$ is kept within 0.25%, and $(n_0-n_3)/n_0$ is controlled within 0.7%.

Another embodiment provided herein is as follows: the few-mode optical fiber is a heterogeneous thirteen-core few-mode optical fiber.

Another embodiment provided herein is as follows: one of the first few-mode subunits is arranged at the center of the few-mode optical fiber, 3 of the second few-mode subunits and 3 of the third few-mode subunits are arranged at intervals around the center of the few-mode optical fiber, connecting lines of geometric centers of the second few-mode subunits and the third few-mode subunits form a first-layer regular hexagon with a core pitch as a side length, and 6 of the first few-mode subunits are located on connecting lines of midpoints of 3 pairs of opposite sides of the regular hexagon and are at a distance of $\sqrt{3}$-fold core pitch away from the center of the few-mode optical fiber.

Another embodiment provided herein is as follows: any two of the second few-mode subunits and the third few-mode subunits which are adjacent to each other on the first-layer regular hexagon form an equilateral triangle with the first few-mode subunit at the center of the optical fiber, and form an equilateral triangle with the corresponding first few-mode subunit at an outermost layer, and the first few-mode subunit at the outermost layer is arranged on a perpendicular bisector of the side length formed by connecting the second few-mode subunit and the third few-mode subunit. Another embodiment provided herein is as follows: an effective refractive index difference between the $LP_{21}$ mode and the $LP_{02}$ mode transmitted in the first few-mode fiber core is $2\times10^{-3}$, an effective refractive index difference between the $LP_{21}$ mode and the $LP_{02}$ mode transmitted in the second few-mode optical fiber is $2\times10^{-3}$, and an effective refractive index difference between the $LP_{21}$ mode and the $LP_{02}$ mode transmitted in the third few-mode optical fiber is $2\times10^{-3}$.

3. Beneficial Effects

Compared with the prior art, the low-crosstalk large-capacity few-mode optical fiber provided herein has the following beneficial effects.

The low-crosstalk large-capacity few-mode optical fiber provided herein is a heterogeneous thirteen-core few-mode optical fiber having a design that combines high-refractive-index ring and trench auxiliary structures in the structure, which can well meet the requirements of low crosstalk, large capacity and high stability in the long-distance transmission process.

According to the low-crosstalk large-capacity few-mode optical fiber provided herein, the effective refractive index difference between LP modes can be increased through the high-refractive-index rings, and the energy coupling between modes in the core can be reduced; in addition, the arrangement of the trench auxiliary structure around the periphery of the fiber core can further reduce the inter-core crosstalk; the arrangement of heterogeneous cores causes different propagation constants and a phase mismatch of adjacent fiber cores, reduces the transverse energy coupling between the fiber cores in a bending state, and finally realizes low crosstalk and bending resistance between the cores of the few-mode optical fiber.

On the basis of the space division multiplexing technique, the low-crosstalk large-capacity few-mode optical fiber provided herein utilizes M fiber cores and N LP modes of the multi-core few-mode optical fiber, with the number of spatial channels reaching 130.

According to the low-crosstalk large-capacity few-mode optical fiber provided herein, through reasonable arrangement of the number of fiber cores and the number of modes in the core, and adjustment of the radius and the refractive index of fiber cores, the number of fiber cores, the thickness of trench and other parameters, each fiber core can transmit an $LP_{01}$ mode, an $LP_{11}$ mode, an $LP_{21}$ mode and an $LP_{02}$ mode, and the effective mode field areas of identical LP mode in all the fiber cores are basically identical.

The low-crosstalk large-capacity few-mode optical fiber provided herein has a relative core multiplexing factor of 27.52.

DETAILED DESCRIPTION OF THE EMBODIMENTS

Figure 1:
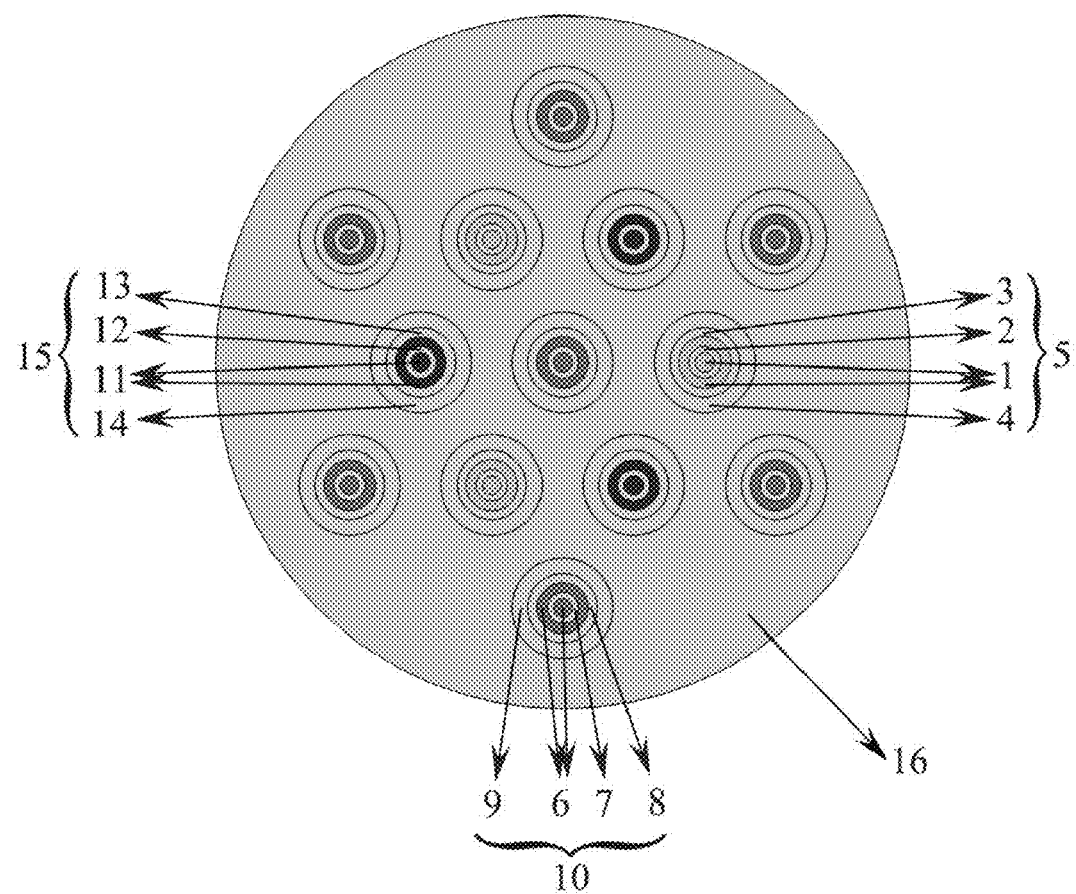
FIG. 1 is a schematic diagram of a low-crosstalk large-capacity few-mode optical fiber according to the present application.
Figure 2:
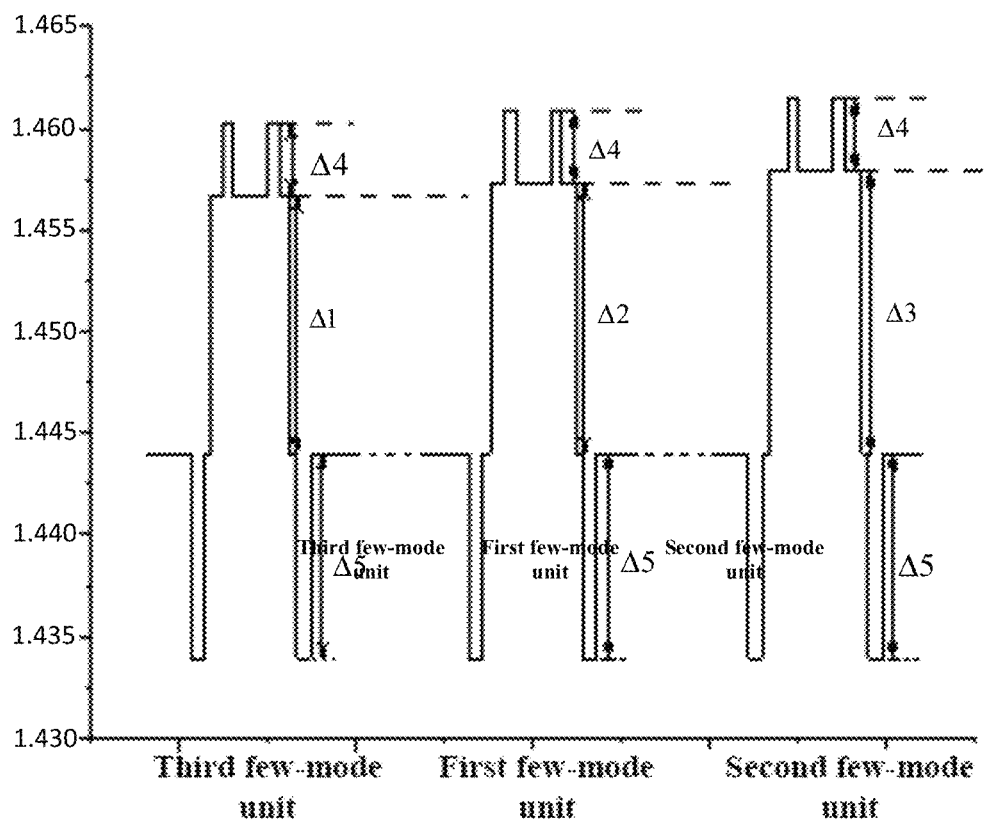
FIG. 2 is a schematic diagram of distribution of refractive indexes of few-mode units of the low-crosstalk large-capacity few-mode optical fiber according to the present application.
Figure 3:
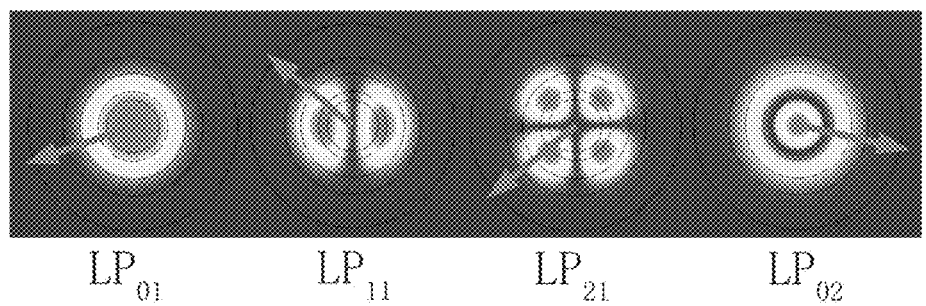
FIG. 3 is a schematic diagram of field distributions of an $LP_{01}$ mode, an $LP_{11}$ mode, an $LP_{21}$ mode and an $LP_{02}$ mode in fiber cores of a few-mode optical fiber with the low-crosstalk large-capacity few-mode optical fiber according to the present application.
Figure 4:
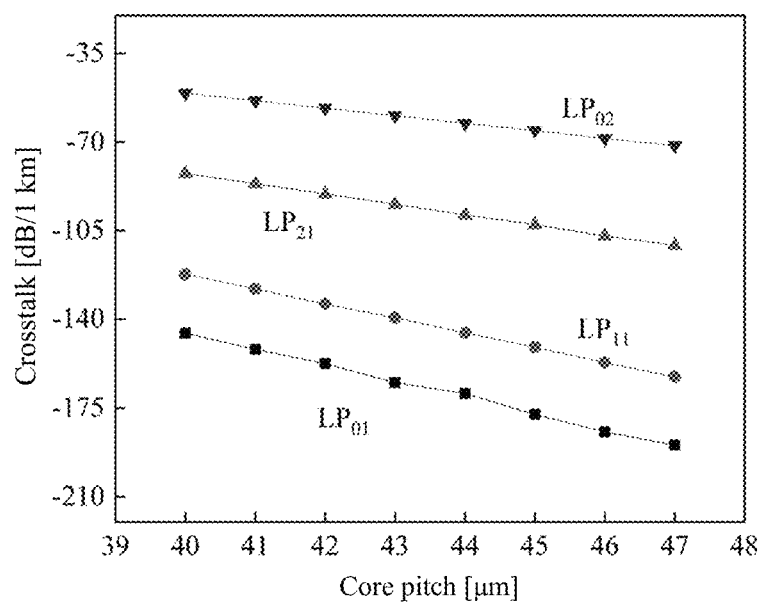
FIG. 4 is a schematic diagram of changes in mode crosstalk over the core pitch between the $LP_{01}$ mode, the $LP_{11}$ mode, the $LP_{21}$ mode and the $LP_{02}$ mode transmitted in first few-mode fiber cores and second few-mode fiber cores of the low-crosstalk large-capacity few-mode optical fiber according to the present application at 1550 nm.
Figure 5:
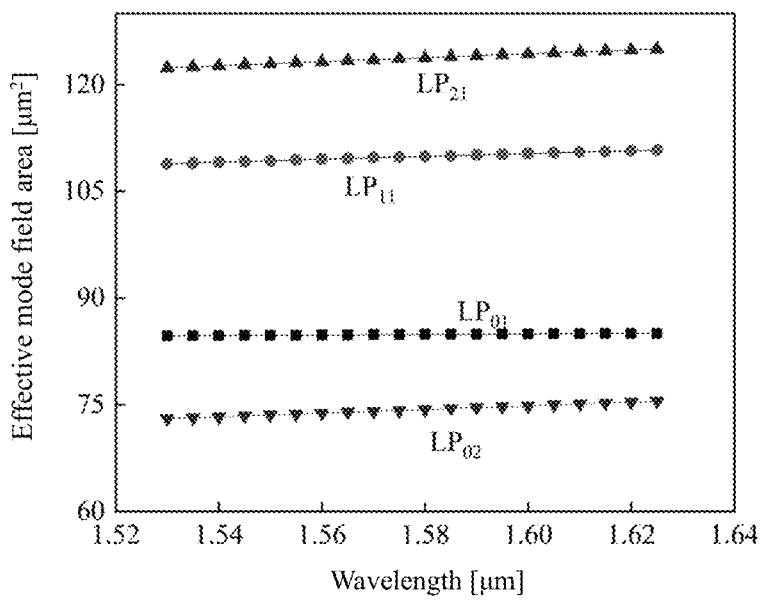
FIG. 5 is a schematic diagram of changes in effective mode field areas of the $LP_{01}$ mode, the $LP_{11}$ mode, the $LP_{21}$ mode and the $LP_{02}$ mode in the first few-mode fiber cores of the low-crosstalk large-capacity few-mode optical fiber according to the present application at the C+L wave band.
Figure 6:
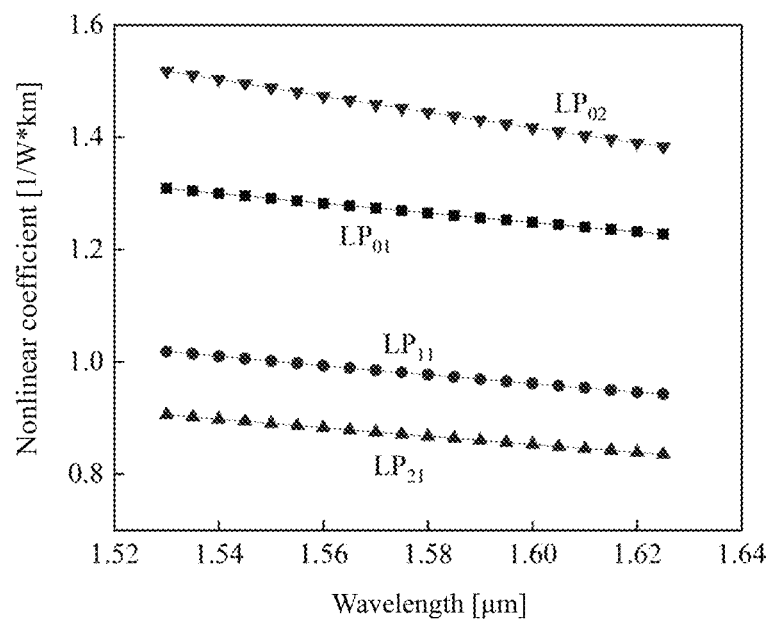
FIG. 6 is a schematic diagram of changes in nonlinear coefficients of the $LP_{01}$ mode, the $LP_{11}$ mode, the $LP_{21}$ mode and the $LP_{02}$ mode in the first few-mode fiber cores of the low-crosstalk large-capacity few-mode optical fiber according to the present application at the C+L wave band.
Figure 7:
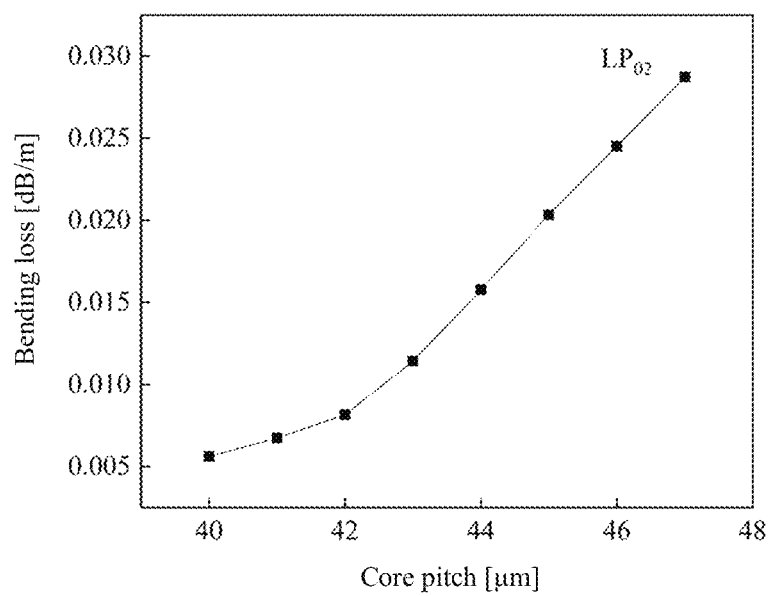
FIG. 7 is a schematic diagram of changes in bending losses of the highest-order mode $LP_{02}$ in the third few-mode fiber cores of the low-crosstalk large-capacity few-mode optical fiber according to the present application over the core pitch at a wavelength of 1625 nm and a bending radius of 30 mm.

Hereinafter, specific embodiments of the present application will be described in detail with reference to the accompanying drawings. According to these detailed descriptions, those skilled in the art can clearly understand and implement the present application. Without departing from the principle of the present application, features of different embodiments may be combined to obtain new embodiments, or substituted for certain features of certain embodiments to obtain other preferred embodiments.

Referring to FIGS. 1 to 9, the present application provides a low-crosstalk large-capacity few-mode optical fiber, which comprises an optical fiber cladding 16, wherein few-mode units are arranged in the optical fiber cladding 16, each few-mode unit sequentially comprises a few-mode fiber core, an inner cladding and a trench from inside to outside, and a high-refractive-index ring is arranged in the few-mode fiber core; the few-mode units comprise first few-mode subunits 10, second few-mode subunits 5 and third few-mode subunits 15, wherein the first few-mode subunits 10, the second few-mode subunits 5 and the third few-mode subunits 15 are arranged at intervals. The first few-mode subunit 10 comprises a first few-mode fiber core 6, the second few-mode subunit 5 comprises a second few-mode fiber core 1, and the third few-mode subunit 15 comprises a third few-mode fiber core 11, radii and refractive indexes of the first few-mode fiber cores 6, the second few-mode fiber cores 1 and the third few-mode fiber cores 11 are different.

The arrangement of heterogeneous cores causes different propagation constants and phase mismatch of adjacent few-mode fiber cores, so that the transverse energy coupling between the fiber cores in a bending state is reduced, and the bending resistance of the few-mode optical fiber is improved; the high-refractive-index ring can improve the effective refractive index difference between the $LP_{21}$ mode and the $LP_{02}$ mode and reduce intra-core crosstalk,; and trench with a low refractive index can further reduce inter-core crosstalk. The inter-core crosstalk of the modes is less than −30 dB at a wavelength of 1550 nm and a transmission distance of 100 km.

Further, the optical fiber cladding 16 is made of a silica material, the inner cladding is made of a silica material, the trench is made of a silica material doped with fluorine, the few-mode fiber core is made of a silica material doped with germanium dioxide, and the high-refractive-index ring is made of a silica material doped with high-concentration germanium dioxide.

The inner claddings herein comprise a first inner cladding 8, a second cladding 3 and a third inner cladding 13, and the three inner claddings are made of the same material and have the same refractive index; the trench herein comprise a first trench 9, a second trench 4 and a third trench 14, and the three trench are made of the same material and have the same refractive index.

Further, the first few-mode fiber cores 6, the second few-mode fiber cores 1 and the third few-mode fiber cores 11 can transmit the $LP_{01}$ mode, the $LP_{11}$ mode, the $LP_{21}$ mode and the $LP_{02}$ mode. Further, the few-mode units have a step-type distribution design in refractive indexes. Further, the optical fiber cladding 16 has a refractive index of $n_0$, and the inner cladding has a refractive index of $n_0$, playing a major role in confining the light energy in the cores based on the total internal reflection principle; the trench has a refractive index of $n_3$, playing a major role in inhibiting mode crosstalk between adjacent fiber cores; the first few-mode fiber core 6 has a refractive index of $n_1$, the second few-mode fiber core 1 has a refractive index of $n_4$, and the third few-mode fiber core 11 has a refractive index of $n_6$; the first few-mode subunit 10 comprises a first high-refractive-index ring 7, the second few-mode subunit 5 comprises a second high-refractive-index ring 2, the third few-mode subunit 15 comprises a third high-refractive-index ring 12, and the first high-refractive-index ring 7 has a refractive index of $n_2$, playing a major role in increasing the effective refractive index difference between the high-order modes $LP_{21}$ and $LP_{02}$ in the first few-mode fiber core 6 and reducing the mode coupling in the cores; the second high-refractive-index ring 2 has a refractive index of $n_5$, and the third high-refractive-index ring 12 has a refractive index of $n_7$; the $n_1$ is greater than the $n_0$, the $n_2$ is greater than the $n_1$, the $n_3$ is less than the $n_0$, the $n_4$ is greater than the $n_0$, the $n_5$ is greater than the $n_4$, the $n_6$ is greater than the $n_0$, and the $n_7$ is greater than the $n_6$.

More high-order modes can be obtained by increasing $n_1$.

In the first few-mode subunit 10, the radius of the first few-mode fiber core 6 is 6.08 μm, the thickness of the first high-refractive-index ring 7 is 1.00 μm, the thickness of the first inner cladding 8 is 1.92 μm, and the thickness of the first trench 9 is 4 μm; in the second few-mode subunit 5, the radius of the second few-mode fiber core 1 is 6.20 μm, the thickness of the second high-refractive-index ring 2 is 1.00 μm, the thickness of the second inner cladding 3 is 1.8 μm, and the thickness of the second trench 4 is 4 μm; in the third few-mode subunit 15, the radius of the third few-mode fiber core 11 is 6.00 μm, the thickness of the third high-refractive-index ring 12 is 1.00 μm, the thickness of the third inner cladding 13 is 2.00 μm, and the thickness of the third trench 14 is 4.00 μm; the diameter of the optical fiber cladding 16 is 240 μm, and the core pitch between any two of the first few-mode fiber cores 1, the second few-mode fiber cores 6 and the third few-mode fiber cores 11 which are adjacent to each other is 45 μm.

Further, $(n_1-n_0)/n_1$ is kept within 0.92%, $(n_2-n_1)/n_2$ is kept within 0.25%, and $(n_0-n_3)/n_0$ is controlled within 0.7%; $(n_4-n_0)/n_4$ is kept within 0.96%, $(n_5-n_4)/n_5$ is kept within 0.25%, and $(n_0-n_3)/n_0$ is controlled within 0.7%; $(n_6-n_0)/n_6$ is kept within 0.88%, $(n_7-n_6)/n_7$ is kept within 0.25%, and $(n_0-n_3)/n_0$ is controlled within 0.7%.

Further, the few-mode optical fiber is a heterogeneous thirteen-core few-mode optical fiber.

Further, one of the first few-mode subunits 10 is arranged at the center of the few-mode optical fiber, 3 of the second few-mode subunits 5 and 3 of the third few-mode subunits 15 are arranged at intervals around the center of the few-mode optical fiber, connecting lines of geometric centers of the second few-mode subunits 5 and the third few-mode subunits 15 form a first-layer regular hexagon with a core pitch as a side length, and 6 of the first few-mode subunits 10 are located on connecting lines of midpoints of 3 pairs of opposite sides of the regular hexagon and are at a distance of √3-fold core pitch away from the center of the few-mode optical fiber.

Further, any two of the second few-mode subunits 5 and the third few-mode subunits 15 which are adjacent to each other on the first-layer regular hexagon form an equilateral triangle with the first few-mode subunit 10 at the center of the optical fiber, and form an equilateral triangle with the corresponding first few-mode subunit 10 at an outermost layer on a connecting line of a midpoint of the second few-mode subunit and the third few-mode subunit.

The number of high-order modes in the first few-mode fiber cores 6, the second few-mode fiber cores 1 and the third few-mode fiber cores 11 can be adjusted by controlling the refractive indexes of the first inner cladding 8, the second inner cladding 3 and the third inner cladding 13; and the number of transmission channels in the few-mode optical fiber is increased through reasonable arrangement of the number of fiber cores in the optical fiber cladding 16.

In the first few-mode subunits 10, the second few-mode subunits 5 and the third few-mode subunits 15, parameters such as the radii and refractive indexes of the first few-mode fiber cores 6, the second few-mode fiber cores 1 and the third few-mode fiber cores 11, the thicknesses and refractive indexes of the first inner claddings 8, the second inner claddings 3 and the third inner claddings 13, the thicknesses and refractive indexes of the first trench 9, the second trench 4, the third trench 14, the first high-refractive-index rings 7, the second high-refractive-index rings 2 and the third high-refractive-index rings 12 can be adjusted to ensure that the first few-mode fiber cores 6, the second few-mode fiber cores 1 and the third few-mode fiber cores 11 can stably transmit an $LP_{01}$ mode, an $LP_{11}$ mode, an $LP_{21}$ mode and an $LP_{02}$ mode at a wavelength of 1550 nm over long distances.

Through the structural arrangement of the heterogeneous cores and in combination with the high-refractive-index ring and trench auxiliary structures, the crosstalk between any adjacent few-mode fiber cores of the few-mode optical fiber is lower than −30 dB/100 km at 1550 nm. The relative core multiplexing factor of the few-mode optical fiber reaches 27.52 by controlling the radii and refractive indexes of the first few-mode fiber cores 6, the second few-mode fiber cores 1 and the third few-mode fiber cores 11, the thicknesses and refractive indexes of the first inner claddings 8, the second inner claddings 3 and the third inner claddings 13 and other parameters. When the bending radius of the first few-mode fiber cores 6, the second few-mode fiber cores 1 and the third few-mode fiber cores 11 is 30 mm at a wavelength of 1625 nm, the bending loss of $LP_{02}$ mode transmitted in the fiber cores is lower than 0.5 dB/100 turns (about 0.0265 dB/m); therefore, the highest-order $LP_{02}$ mode and $LP_{01}$ mode, $LP_{11}$ mode and $LP_{21}$ mode can be stably transmitted over long distances.

At a wavelength of 1550 nm, the $A_{eff}$ conditions of the 4 modes in the first few-mode fiber cores 6, the second few-mode fiber cores 1 and the third few-mode fiber cores 11 are as follows: the $A_{eff}$ of the $LP_{01}$ mode is greater than 84.00 μm², the $A_{eff}$ of the $LP_{11}$ mode is greater than 108.58 μm², the $A_{eff}$ of the $LP_{21}$ mode is greater than 122.93 μm², and the $A_{eff}$ of the $LP_{02}$ mode is greater than 74.37 μm²⁻; and γ of the 4 modes is as follows: γ of the $LP_{01}$ mode is less than 1.30 W⁻¹·km⁻¹, γ of the $LP_{11}$ mode is less than 1.00 W⁻¹·km⁻¹, γ of the $LP_{21}$ mode is less than 0.89 W⁻¹·km⁻¹, of the $LP_{02}$ mode is less than 1.49 W⁻¹·km⁻¹. The bending loss of the highest-order $LP_{02}$ mode supported by the first few-mode fiber cores 6, the second few-mode fiber cores 1 and the third few-mode fiber cores 11 is less than 0.5 dB/100 turns (about 0.0265 dB/m), the effective refractive index differences between the $LP_{21}$ mode and the $LP_{02}$ mode transmitted in 3 types of the first few-mode fiber cores 6, the second few-mode fiber cores 1 and the third few-mode fiber cores 11 are 2×10⁻³, which reduces the degrees of coupling between modes in the core.

The low-crosstalk large-capacity few-mode optical fiber disclosed herein combines the advantages of the high-refractive-index ring and trench auxiliary structures, and thus the effective refractive index difference between the $LP_{21}$ mode and the $LP_{02}$ mode in the first few-mode fiber cores 6, the second few-mode fiber cores 1 and the third few-mode fiber cores 11 can be improved, and the energy coupling between the $LP_{21}$ mode and the $LP_{02}$ mode can be reduced; the arrangement of the first trench 9, the second trench 4 and the third trench 14 can reduce the peripheral refractive indexes of the first few-mode fiber cores 6, the second few-mode fiber cores 1 and the third few-mode fiber cores 11, thereby reducing the inter-core crosstalk.

The low-crosstalk large-capacity few-mode optical fiber disclosed herein allows large and basically identical effective mode field areas to identical LP modes in all the fiber cores and reduced γ to the modes through the optimization of parameters such as the radii and refractive indexes of the first few-mode fiber cores 6, the second few-mode fiber cores 1 and the third few-mode fiber cores 11, the thicknesses and the refractive indexes of the first trench 9, the second trench 4 and the third trench 14, and the thicknesses of the first high-refractive-index rings 7, the second high-refractive-index rings 2 and the third high-refractive-index rings 12.

For the low-crosstalk large-capacity few-mode optical fiber disclosed herein, the trench auxiliary structure is easier to prepare than the air hole auxiliary structure, and in addition, the problems such as the collapse and deformation of air holes are avoided, and thus the preparation difficulty can be reduced in the wiredrawing process. Compared with homogeneous core arrangement, heterogeneous core arrangement causes different radii and refractive indexes of any adjacent few-mode fiber cores and also different propagation constants and mutual coupling coefficients of the adjacent fiber cores, so that a phase mismatch occurs in a bending state, and thus transverse energy coupling between the cores in the bending state can be effectively inhibited, and the bending resistance of the few-mode optical fiber is improved.

The low-crosstalk large-capacity few-mode optical fiber disclosed herein comprises first few-mode fiber cores 6, second few-mode fiber cores 1 and third few-mode fiber cores 11 and an optical fiber cladding 16, and each optical fiber core can transmit an $LP_{01}$ mode, an $LP_{11}$ mode, an $LP_{21}$ mode and an $LP_{02}$ mode, so that the transmission capacity can be improved in multiples.

EMBODIMENT

The present embodiment provides a heterogeneous thirteen-core few-mode optical fiber combined with high-refractive-index ring and trench auxiliary structures, which consists of first few-mode subunits 10, second few-mode subunits 5, third few-mode subunits 15 and an optical fiber cladding 16, and the radii and refractive indexes of any two adjacent few-mode fiber cores are different. The few-mode units have a step-type distribution design in refractive indexes, and each sequentially comprises a few-mode fiber core, an inner cladding and a trench from inside to outside, and a high-refractive-index ring is arranged in the few-mode fiber core. One of the first few-mode subunits 10 is located at the center of the optical fiber, and the remaining 12 few-mode units are arranged in a regular hexagon structure, that is, 3 of the second few-mode subunits 5 and 3 of the third few-mode subunits 15 are arranged at intervals around the first few-mode subunit 10 at the center of the optical fiber, connecting lines of geometric centers of the second few-mode subunits and the third few-mode subunits form a first-layer regular hexagon with a core pitch as a side length, and the remaining 6 first few-mode subunits 10 are located on connecting lines of midpoints of 3 pairs of opposite sides of the first-layer regular hexagon, respectively and are at a distance of √3-fold core pitch away from the center of the optical fiber. Any two of the second few-mode subunits 5 and the third few-mode subunits 15 which are adjacent to each other on the first-layer regular hexagon form an equilateral triangle with the first few-mode subunit 10 at the center of the optical fiber, and form an equilateral triangle with the corresponding first few-mode subunit 10 at an outermost layer on a connecting line of a midpoint of the second few-mode subunit and the third few-mode subunit. In the first few-mode subunit 10, the radius of the first few-mode fiber core 6 is 6.08 μm, the thickness of the first high-refractive-index ring 7 is 1.00 μm, the thickness of the first inner cladding 8 is 1.92 μm, and the thickness of the first trench 9 is 4.00 μm; in the second few-mode subunit 5, the radius of the fiber core 1 is 6.20 μm, the thickness of the second high-refractive-index ring 2 is 1.00 μm, the thickness of the second inner cladding 3 is 1.80 μm, and the thickness of the second trench 4 is 4.00 μm; in the third few-mode subunit 15, the radius of the fiber core 11 is 6.00 μm, the thickness of the third high-refractive-index ring 12 is 1.00 μm, the thickness of the third inner cladding 13 is 2.00 μm, and the thickness of the third trench 14 is 4.00 μm; the distance between adjacent fiber cores is 45 μm, and the diameter of the optical fiber cladding is 240 μm.

Δ1 is a relative refractive index difference between the third few-mode fiber core 11 and the third inner cladding 13, Δ2 is a relative refractive index difference between the first few-mode fiber core 6 and the first inner cladding 8, Δ3 is a relative refractive index difference between the second few-mode fiber core 1 and the second inner cladding 3, Δ4 is a relative refractive index difference between the third high-refractive-index ring 12, the first high-refractive-index ring 7 and the second high-refractive-index ring 2 and the third few-mode fiber core 11, the first few-mode fiber core 6 and the second few-mode fiber core 1, and Δ5 is a relative refractive index difference between the third trench 14, the first trench 9 and the second trench 4 and the optical fiber cladding 16.

For the heterogeneous thirteen-core few-mode optical fiber combined with high-refractive-index ring and trench auxiliary structures, in the first few-mode subunit 10, the first few-mode fiber core 6 is made of a silica material doped with germanium dioxide, with a refractive index of 1.4573, the relative refractive index difference Δ1 between the first few-mode fiber core 6 and the first inner cladding 8 is 0.92%, the relative refractive index difference Δ4 between the first high-refractive-index ring 7 and the first few-mode fiber core 6 is 0.25%, and the relative refractive index difference Δ5 between the first trench 9 and the few-mode optical fiber cladding 16 is 0.7%; in the second few-mode subunit 5, the second few-mode fiber core 1 is made of a silica material doped with germanium dioxide, with a refractive index of 1.4579, the relative refractive index difference Δ1 between the second few-mode fiber core 1 and the second inner cladding 3 is 0.96%, the relative refractive index difference Δ4 between the second high-refractive-index ring 2 and the second few-mode fiber core 1 is 0.25%, and the relative refractive index difference Δ5 between the second trench 4 and the few-mode optical fiber cladding 16 is 0.7%; in the third few-mode subunit 15, the third few-mode fiber core 11 is made of a silica material doped with germanium dioxide, with a refractive index of 1.4567, the relative refractive index difference Δ1 between the third few-mode fiber core 11 and the third inner cladding 13 is 0.88%, the relative refractive index difference Δ4 between the third high-refractive-index ring 12 and the third few-mode fiber core 11 is 0.25%, and the relative refractive index difference Δ5 between the third trench 14 and the few-mode optical fiber cladding 16 is 0.7%, the first inner cladding 8, the second inner cladding 3, the third inner cladding 13 and the optical fiber cladding 16 having the same refractive index.

For the heterogeneous thirteen-core few-mode optical fiber combined with high-refractive-index ring and trench auxiliary structures provided herein, the inter-core crosstalk between adjacent fiber cores can be characterized by the following formula:

$$XT = 10 \log[\tan h(\overline{h}_{ij}L)]$$

wherein, XT is crosstalk, and can be obtained from the average power coupling coefficient $\overline{h}_{ij}$ and the transmission length L. After the parameters of the heterogeneous few-mode optical fiber are optimized, the inter-core crosstalk is lower than −30 dB at a wavelength of 1550 nm and a transmission distance of 100 km.

For the heterogeneous thirteen-core few-mode optical fiber combined with high-refractive-index ring and trench auxiliary structures provided herein, the relationship between the nonlinear coefficient of the optical fiber and the effective mode field area can be characterized by the following formula:

$$\gamma = \frac{2\pi n_2}{\lambda * A_{\mathit{eff}}}$$

wherein, $n_2$ is the nonlinear refractive index coefficient of the material, for pure silica material, $n_2 = 2.7 \times 10^{-20}$ m$^2$/W, and $A_{\mathit{eff}}$ is the effective mode field area of the mode. The larger the $A_{\mathit{eff}}$ of the mode is, the smaller the γ is.

For the heterogeneous thirteen-core few-mode optical fiber combined with high-refractive-index ring and trench auxiliary structures provided herein, the first few-mode fiber cores 6, the second few-mode fiber cores 1 and the third few-mode fiber cores 11 can support the transmission of the $LP_{01}$ mode, the $LP_{11}$ mode, the $LP_{21}$ mode and the $LP_{02}$ mode at the C+L wave band. At a wavelength of 1550 nm, the effective refractive index differences between the $LP_{21}$ mode and the $LP_{02}$ mode in the first few-mode fiber cores 6, the second few-mode fiber cores 1 and the third few-mode fiber cores 11 are all $2.0 \times 10^{-3}$.

At a wavelength of 1550 nm, the $A_{\mathit{eff}}$ of the 4 modes in the first few-mode fiber cores 6, the second few-mode fiber cores 1 and the third few-mode fiber cores 11 are as follows: the $A_{\mathit{eff}}$ of the $LP_{01}$ mode is 84.77 μm$^2$, 86.27 μm$^2$ and 84.01 μm$^2$, respectively; the $A_{\mathit{eff}}$ of the $LP_{11}$ mode is 109.28 μm$^2$, 111.07 μm$^2$ and 108.58 μm$^2$, respectively, the $A_{\mathit{eff}}$ of the $LP_{21}$ mode is 122.93 μm$^2$, 124.12 μm$^2$ and 123.02 μm$^2$, respectively, and the $A_{\mathit{eff}}$ of the $LP_{02}$ mode is 73.55 μm$^2$, 73.59 μm$^2$ and 74.37 μm$^2$, respectively, the $A_{\mathit{eff}}$ of the same mode being basically identical. γ of the 4 modes in the first few-mode fiber cores 6, the second few-mode fiber cores 1 and the third few-mode fiber cores 11 are as follows: γ of the $LP_{01}$ mode is 1.29 W$^{-1}$·km$^{-1}$, 1.27 W$^{-1}$·km$^{-1}$ and 1.30 W$^{-1}$·km$^{-1}$, respectively; γ of the $LP_{11}$ mode is 1.00 W$^{-1}$·km$^{-1}$, 0.99 W$^{-1}$·km$^{-1}$ and 1.01 W$^{-1}$·km$^{-1}$, respectively; γ of the $LP_{21}$ mode is 0.89 W$^{-1}$·km$^{-1}$, 0.88 W$^{-1}$·km$^{-1}$ and 0.89 W$^{-1}$·km$^{-1}$, respectively; γ of the $LP_{02}$ mode is 1.49 W$^{-1}$·km$^{-1}$, 1.49 W$^{-1}$·km$^{-1}$ and 1.47 W$^{-1}$·km$^{-1}$, respectively.

For the heterogeneous thirteen-core few-mode optical fiber combined with high-refractive-index ring and trench auxiliary structures provided herein, the relative core multiplexing factor of the 13-core few-mode optical fiber is 27.52.

For the heterogeneous thirteen-core few-mode optical fiber combined with high-refractive-index ring and trench auxiliary structures provided herein, at a wavelength of 1550 nm and at a transmission distance of 100 km, the inter-core crosstalk of the 4 modes between the first few-mode fiber cores 6 and the second few-mode fiber cores 1, between the first few-mode fiber cores 6 and the third few-mode fiber cores 11, and between the second few-mode fiber cores 1 and the third few-mode fiber cores 11 is as follows: the crosstalk of the $LP_{01}$ mode is −157.52 dB, −157.08 dB and −165.92 dB, respectively; the crosstalk of the $LP_{11}$ mode is −130.99 dB, −111.58 dB and −123.82 dB, respectively; the crosstalk of the $LP_{21}$ mode is −82.55 dB, −73.86 dB and −80.32 dB, respectively; the crosstalk of the $LP_{02}$ mode is −45.42 dB, −34.24 dB and −45.28 dB, respectively.

Figure 8:
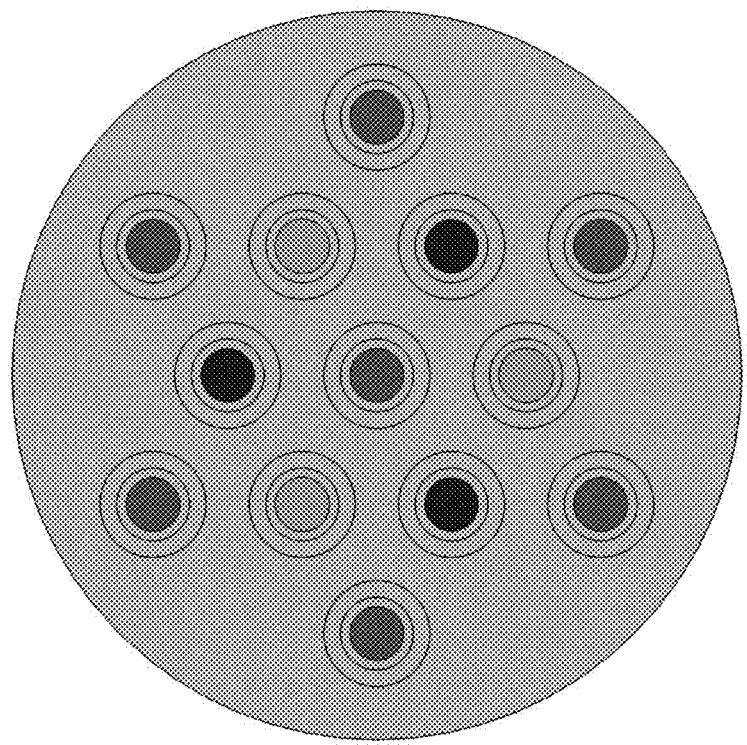
FIG. 8 is a cross-sectional schematic diagram of a trench-assisted heterogeneous thirteen-core few-mode optical fiber.

In order to highlight the advantages of the heterogeneous thirteen-core few-mode optical fiber combined with high-refractive-index ring and trench auxiliary structures, a trench-assisted heterogeneous thirteen-core few-mode optical fiber is provided as a reference, which consists of 3 types of few-mode units and an optical fiber cladding, and the radii and refractive indexes of any two adjacent few-mode fiber cores are different, as shown in FIG. 8. One of the few-mode units is located at the center of the optical fiber, and the remaining 12 few-mode units are arranged in a regular hexagon structure, that is, 3 of the second few-mode subunits and 3 of the third few-mode subunits are arranged at intervals around the few-mode unit at the center of the optical fiber, connecting lines of geometric centers of the second few-mode subunits and the third few-mode subunits form a first-layer regular hexagon with a core pitch as a side length, and the remaining 6 few-mode units are located on connecting lines of midpoints of 3 pairs of opposite sides of the first-layer regular hexagon, respectively and are at a distance of √3-fold core pitch away from the center of the optical fiber. Any two adjacent few-mode units on the first-layer regular hexagon form an equilateral triangle with the few-mode unit at the center of the optical fiber, and form an equilateral triangle with the corresponding few-mode unit at an outermost layer on a connecting line of a midpoint of these two few-mode units. In the first few-mode subunit, the radius of the few-mode fiber core is 6.08 μm, the thickness of the inner cladding is 1.92 μm, and the thickness of the trench is 4.00 μm; in the second few-mode subunit, the radius of the few-mode fiber core is 6.20 μm, the thickness of the inner cladding is 1.80 μm, and the thickness of the trench is 4.00 μm; in the third few-mode subunit, the radius of the few-mode fiber core is 6.00 μm, the thickness of the inner cladding is 2.00 μm, and the thickness of the trench is 4.00 μm; the distance between adjacent fiber cores is 45 μm, and the diameter of the optical fiber is 240 μm.

For the trench-assisted heterogeneous thirteen-core few-mode optical fiber, in the first few-mode subunit, the few-mode fiber core area is made of a silica material doped with germanium dioxide, with a refractive index of 1.4573, the relative refractive index difference between the few-mode fiber core and the inner cladding is 0.92%, and the relative refractive index difference between the trench and the optical fiber cladding is 0.7%; in the second few-mode subunit, the few-mode fiber core area is made of a silica material doped with germanium dioxide, with a refractive index of 1.4579, the relative refractive index difference between the few-mode fiber core and the inner cladding is 0.96%, and the relative refractive index difference between the trench and the optical fiber cladding is 0.7%; in the third few-mode subunit, the few-mode fiber core area is made of a silica material doped with germanium dioxide, with a refractive index of 1.4567, the relative refractive index difference between the few-mode fiber core and the inner cladding is 0.88%, and the relative refractive index difference between the trench and the optical fiber cladding is 0.7%, the inner cladding and the optical fiber cladding having the same refractive index.

At a wavelength of 1550 nm and a transmission distance of 100 km, the inter-core crosstalk of the 4 modes between the 3 types of few-mode fiber cores is as follows: the crosstalk of the $LP_{01}$ mode is −147.83 dB, −146.94 dB and −155.13 dB, respectively; the crosstalk of the $LP_{11}$ mode is −117.82 dB, −94.76 dB and −106.86 dB, respectively; the crosstalk of the $LP_{21}$ mode is −68.40 dB, −58.30 dB and −57.50 dB, respectively; the crosstalk of the $LP_{02}$ mode is −43.64 dB, −30.46 dB and −42.77 dB, respectively.

In the 3 types of few-mode fiber cores, γ of the $LP_{01}$ mode, the $LP_{11}$ mode, the $LP_{21}$ mode and the $LP_{02}$ mode at a wavelength of 1550 nm is as follows: γ of the $LP_{01}$ mode is 1.33 $W^{-1}·km^{-1}$, 1.30 $W^{-1}·km^{-1}$ and 1.34 $W^{-1}·km^{-1}$, respectively; γ of the $LP_{11}$ mode is 0.94 $W^{-1} km^{-1}$, 0.92 $W^{-1}·km^{-1}$ and 0.94 $W^{-1}·km^{-1}$, respectively; γ of the $LP_{21}$ mode is 0.85 $W^{-1}·km^{-1}$ 0.85 $W^{-1}·km^{-1}$ and 0.85 $W^{-1} km^{-1}$, respectively; γ of the $LP_{02}$ mode is 1.42 $W^{-1} km^{-1}$, 1.43 $W^{-1} km^{-1}$ and 1.40 $W^{-1} km^{-1}$, respectively. Compared with the few-mode optical fiber combined with high-refractive-index rings and trench, in the absence of high-refractive-index rings, mode crosstalk between adjacent fiber cores is significantly increased, but γ of modes is reduced.

In the absence of high-refractive-index rings, the effective refractive index differences between the $LP_{21}$ mode and the $LP_{02}$ mode in the 3 types of few-mode fiber cores are $1.4×10^{-3}$, $1.4×10^{-3}$ and $1.3×10^{-3}$, respectively, and the degrees of coupling between modes in the core are increased.

Figure 9:
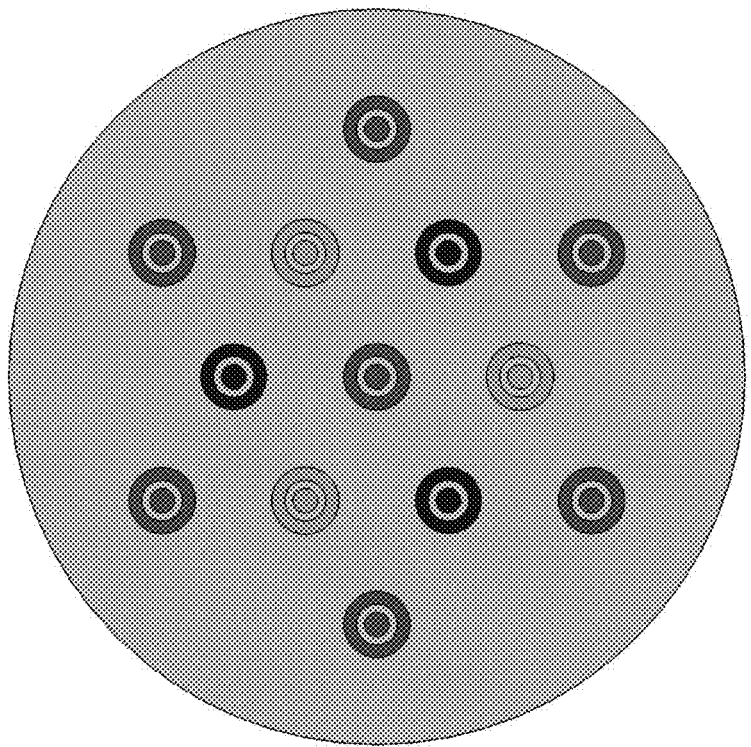
FIG. 9 is a cross-sectional schematic diagram of the heterogeneous thirteen-core few-mode optical fiber with high-refractive-index rings.

In order to highlight the advantages of the heterogeneous thirteen-core few-mode optical fiber combined with high-refractive-index ring and trench auxiliary structures, a high-refractive-index-ring-assisted heterogeneous thirteen-core few-mode optical fiber is provided as a reference, which consists of 3 types of few-mode units and an optical fiber cladding, and the radii and refractive indexes of any two adjacent few-mode fiber cores are different, as shown in FIG. 9. One of the few-mode units is located at the center of the optical fiber, and the remaining 12 few-mode units are arranged in a regular hexagon structure, that is, 3 of the few-mode units and 3 of the few-mode units are arranged at intervals around the few-mode unit at the center of the optical fiber, connecting lines of geometric centers of these few-mode units form a first-layer regular hexagon with a core pitch as a side length, and the remaining 6 few-mode units are located on connecting lines of midpoints of 3 pairs of opposite sides of the first-layer regular hexagon, respectively and are at a distance of √3-fold core pitch away from the center of the optical fiber. Any two adjacent few-mode units on the first-layer regular hexagon form an equilateral triangle with the few-mode unit at the center of the optical fiber, and form an equilateral triangle with the corresponding few-mode unit at an outermost layer on a connecting line of a midpoint of these two few-mode units. In the first few-mode subunit, the radius of the few-mode fiber core is 6.08 μm, and the thickness of the high-refractive-index ring is 1.00 μm; in the second few-mode subunit, the radius of the few-mode fiber core is 6.20 μm, and the thickness of the high-refractive-index ring is 1.00 μm; in the third few-mode subunit, the radius of the few-mode fiber core is 6.00 μm, and the thickness of the high-refractive-index ring is 1.00 μm; the distance between adjacent fiber cores is 45 μm, and the diameter of the optical fiber is 240 μm.

For the high-refractive-index-ring-assisted heterogeneous thirteen-core few-mode optical fiber, in the first few-mode subunit, the few-mode fiber core area is made of a silica material doped with germanium dioxide, with a refractive index of 1.4573, the relative refractive index difference between the few-mode fiber core and the optical fiber cladding is 0.92%, and the relative refractive index difference between the high-refractive-index ring and the few-mode fiber core is 0.25%; in the second few-mode subunit, the second few-mode fiber core area is made of a silica material doped with germanium dioxide, with a refractive index of 1.4579, the relative refractive index difference between the few-mode fiber core and the optical fiber cladding is 0.96%, and the relative refractive index difference between the high-refractive-index ring and the few-mode optical core is 0.25%; in the third few-mode subunit, the few-mode fiber core area is made of a silica material doped with germanium dioxide, with a refractive index of 1.4567, the relative refractive index difference between the few-mode fiber core and the optical fiber cladding is 0.88%, and the relative refractive index difference between the high-refractive-index ring and the few-mode fiber core is 0.25%.

At a wavelength of 1550 nm and at a transmission distance of 100 km, the inter-core crosstalk of the 4 modes between the 3 types of few-mode fiber cores is as follows: the crosstalk of the $LP_{01}$ mode is −145.95 dB, −139.82 dB and −147.80 dB, respectively; the crosstalk of the $LP_{11}$ mode is −99.01 dB, −95.34 dB and −95.77 dB, respectively; the crosstalk of the $LP_{21}$ mode is −59.31 dB, −49.79 dB and −63.74 dB, respectively; the crosstalk of the $LP_{02}$ mode is −21.41 dB, −8.24 dB and −23.86 dB, respectively.

In the 3 types of few-mode fiber cores, γ of the $LP_{01}$ mode, the $LP_{11}$ mode, the $LP_{21}$ mode and the $LP_{02}$ mode at a wavelength of 1550 nm is as follows: γ of the $LP_{01}$ mode is 1.28 $W^{-1} \cdot km^{-1}$, 1.26 $W^{-1} \cdot km^{-1}$ and 1.29 $W^{-1} \cdot km^{-1}$, respectively; γ of the $LP_{11}$ mode is 0.98 $W^{-1} \cdot km^{-1}$, 0.97 $W^{-1} \cdot km^{-1}$ and 0.99 $W^{-1} \cdot km^{-1}$, respectively; γ of the $LP_{21}$ mode is 0.84 $W^{-1} \cdot km^{-1}$, 0.84 $W^{-1} \cdot km^{-1}$ and 0.83 $W^{-1} \cdot km^{-1}$ respectively; γ of the $LP_{02}$ mode is 1.22 $W^{-1} \cdot km^{-1}$, 1.28 $W^{-1} \cdot km^{-1}$ and 1.13 $W^{-1} \cdot km^{-1}$, respectively. Compared with the heterogeneous thirteen-core few-mode optical fiber combined with high-refractive-index ring and trench auxiliary structures, in the absence of the trench auxiliary structure, the inter-core crosstalk significantly increases, resulting in stable transmission of only $LP_{01}$ mode, $LP_{11}$ mode and $LP_{21}$ mode in each few-mode fiber core, but γ of the mode in the core is significantly reduced.

Although the present application has been described above with reference to specific embodiments, those skilled in the art will recognize that many modifications may be made to the configuration and details of the present application within the principles and scope of the present application. The protection scope of the present application is determined by the appended claims, and the claim is intended to embrace all modifications that come within the meaning and range of equivalences of the technical features of the claims.

What is claimed is:

1. A low-crosstalk large-capacity few-mode optical fiber, comprising an optical fiber cladding, wherein few-mode units are arranged in the optical fiber cladding, each of the few-mode units sequentially comprises a few-mode fiber core, an inner cladding and a trench from inside to outside, and a high-refractive-index ring is arranged in the few-mode fiber core; the few-mode units comprise first few-mode subunits, second few-mode subunits and third few-mode subunits, wherein the first few-mode subunits, the second few-mode subunits and the third few-mode subunits are arranged at intervals; and each of the first few-mode subunits comprises a first few-mode fiber core, each of the second few-mode subunits comprises a second few-mode fiber core, and each of the third few-mode subunits comprises a third few-mode fiber core, wherein radii of the first few-mode fiber cores, the second few-mode fiber cores and the third few-mode fiber cores are different, and refractive indexes of the first few-mode fiber cores, the second few-mode fiber cores and the third few-mode fiber cores are different;

wherein the optical fiber cladding is made of a silica material, the inner cladding is made of a silica material, the trench is made of a silica material doped with fluorine, the few-mode fiber core is made of a silica material doped with germanium dioxide, and the high-refractive-index ring is made of a silica material doped with high-concentration germanium dioxide;

wherein the few-mode units have a step-type distribution design in refractive indexes;

wherein the optical fiber cladding has a refractive index of $n_0$, the inner cladding has a refractive index of $n_0$, the trench has a refractive index of $n_3$, the first few-mode fiber core has a refractive index of $n_1$, the second few-mode fiber core has a refractive index of $n_4$, and the third few-mode fiber core has a refractive index of $n_6$;

each of the first few-mode subunits comprises a first high-refractive-index ring, each of the second few-mode subunits comprises a second high-refractive-index ring, and each of the third few-mode subunits comprises a third high-refractive-index ring, wherein the first high-refractive-index ring has a refractive index of $n_2$, the second high-refractive-index ring has a refractive index of $n_5$, and the third high-refractive-index ring has a refractive index of $n_7$ and the $n_1$ is greater than the $n_0$, the $n_2$ is greater than the $n_1$, the $n_3$ is less than the $n_0$, the $n_4$ is greater than the $n_0$, the $n_5$ is greater than the $n_4$, the $n_6$ is greater than the $n_0$, and the $n_7$ is greater than the $n_6$.

2. The low-crosstalk large-capacity few-mode optical fiber according to claim 1, wherein the first few-mode fiber core, the second few-mode fiber core and the third few-mode fiber core are configured to transmit an $LP_{01}$ mode, an $LP_{11}$ mode, an $LP_{21}$ mode and an $LP_{02}$ mode.

3. The low-crosstalk large-capacity few-mode optical fiber according to claim 1, wherein $(n_1-n_0)/n_1$ is kept within 0.92%, $(n_2-n_1)/n_2$ is kept within 0.25%, and $(n_0-n_3)/n_0$ is controlled within 0.7%; $(n_4-n_0)/n_4$ is kept within 0.96%, $(n_5 31\ n_4)n_5$ is kept within 0.25%, and $(n_0-n_3)/n_0$ is controlled within 0.7%; $(n_6-n_0)/n_6$ is kept within 0.88%, $(n_7-n_0)/n_7$ is kept within 0.25%, and $(n_0-n_3)/n_0$ is controlled within 0.7%.

4. The low-crosstalk large-capacity few-mode optical fiber according to claim I, wherein the low-crosstalk large-capacity few-mode optical fiber is a heterogeneous thirteen-core few-mode optical fiber.

5. A low-crosstalk large-capacity few-mode optical fiber, comprising an optical fiber cladding, wherein few-mode units are arranged in the optical fiber cladding, each of the few-mode units sequentially comprises a few-mode fiber core, an inner cladding and a trench from inside to outside, and a high-refracture-index ring is arranged in the few-mode fiber core; the few-mode units comprise first few-mode subunits, second few-mode subunits and third few-mode subunits, wherein the first few-mode subunits, the second few-mode subunits and the third few-mode subunits are arranged at intervals; and each of the first few-mode subunits comprises a first few-mode fiber core, each of the second few-mode subunits comprises a second few-mode fiber core, and each of the third few-mode subunits comprises a third few-mode fiber core. wherein radii of the first few-mode fiber cores, the second few-mode fiber cores and the third few-mode fiber cores are different, and refractive indexes of the first few-mode fiber cores, the second few-mode fiber cores and the third few-mode fiber cores are different;

wherein the low-crosstalk large-capacity few-mode optical fiber is a heterogeneous thirteen-core few-mode optical fiber: and wherein one of the first few-mode subunits is arranged at a center of the low-crosstalk large-capacity few-mode optical fiber, three of the second few-mode subunits and three of the third few-mode subunits are arranged at intervals around the center of the low-crosstalk large-capacity few-mode optical fiber, connecting lines of geometric centers of the second few-mode subunits and the third few-mode subunits form a first-layer regular hexagon with a core pitch as a side length, and six of the first few-mode subunits are located on connecting lines of midpoints of three pairs of opposite sides of the first-layer regular hexagon and are at a distance of $\sqrt{3}$-fold core pitch away from the center of the low-crosstalk large-capacity few-mode optical fiber.

6. The low-crosstalk large-capacity few-mode optical fiber according to claim 5, wherein a second few-mode subunit of the second few-mode subunits and a third few-mode subunit of the third few-mode subunits are adjacent to each other on the first-layer regular hexagon, and the second few-mode subunit and the third few-mode subunit form a first equilateral triangle with the first few-mode subunit at the center of the low-crosstalk large-capacity few-mode optical fiber, and form a second equilateral triangle with the corresponding first few-mode subunit at an outermost layer; and the first few-mode subunit at the outermost layer is arranged on a perpendicular bisector of the side length formed by connecting the second few-mode subunit and the third few-mode subunit.

7. The low-crosstalk large-capacity few-mode optical fiber according to claim 6, wherein a first effective refractive index difference between an $LP_{21}$ mode and an $LP_{02}$ mode transmitted in the first few-mode fiber core is $2\times10^{-3}$, a second effective refractive index difference between the $LP_{21}$ mode and the $LP_{02}$ mode transmitted in the second few-mode fiber is $2\times1^{-3}$, and a third effective refractive index difference between the $LP_{21}$ mode and the $LP_{02}$ mode transmitted in the third few-mode fiber is $2\times10^{-3}$.

* * * * *